(No Model.)
A. KRIEGER.
SAW.
No. 494,210. Patented Mar. 28, 1893.
Fig. 1.
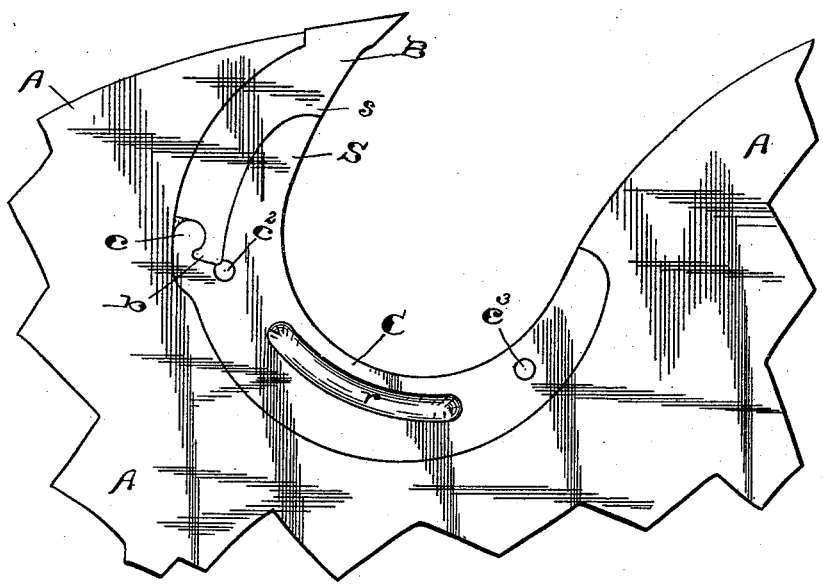
Fig. 2.
Fig. 3.
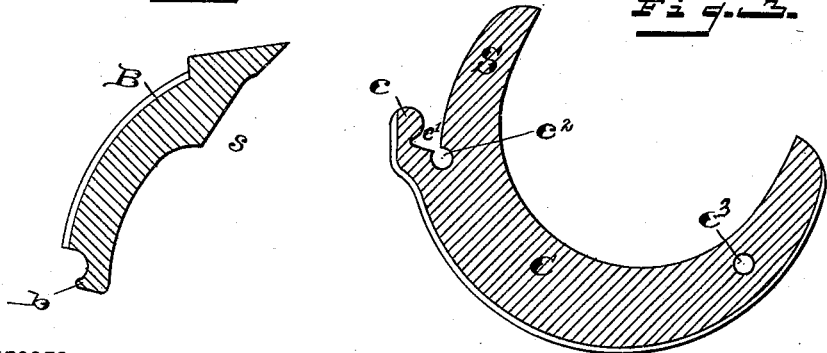
WITNESSES:
F. W. Warner.
J. A. Walsh.
INVENTOR
Andrew Krieger,
per
Chester Bradford,
ATTORNEYS.

UNITED STATES PATENT OFFICE.

ANDREW KRIEGER, OF INDIANAPOLIS, INDIANA, ASSIGNOR TO THE E. C. ATKINS & COMPANY, OF SAME PLACE.

SAW.

SPECIFICATION forming part of Letters Patent No. 494,210, dated March 28, 1893.

Application filed July 14, 1892. Serial No. 440,063. (No model.)

*To all whom it may concern:*

Be it known that I, ANDREW KRIEGER, a citizen of the United States, residing at Indianapolis, in the county of Marion and State of Indiana, have invented certain new and useful Improvements in Saws, of which the following is a specification.

The teeth of inserted tooth saws as ordinarily constructed, are apt from one cause or another to become loosened, and consequently in danger of being thrown from place. Any such looseness also impairs the efficiency of the saw for work. One prolific cause of this is the hammering which the holders are subjected to by inexperienced or careless operators. To produce a saw which will obviate these disadvantages is the object of my present invention, which consists in an improved form or construction of the parts, as will be hereinafter more particularly described and claimed.

Referring to the accompanying drawings, which are made a part hereof, and on which similar letters of reference indicate similar parts, Figure 1 is a side elevation of a fragment of a circular saw, with a tooth and holder embodying my said invention; Fig. 2 a central sectional view of the tooth separately, and Fig. 3 a similar view of the holder separately.

In said drawings the portions marked A represent a fragment of the saw blade; B the tooth, and C the holder.

The saw A has a socket to receive the tooth and holder, as is usual, and which is in substantially the usual form, except that the portion which receives the tooth is formed on a circle of greater radius than the other portions.

The tooth B is of a well known form at the point, and its shank is of substantially uniform diameter throughout the greater portion of its length. At its lower end it is cut away or recessed at the under side, below which recess is a projecting point $b$ which engages with a corresponding recess in the holder. Near the upper end a shoulder $s$ is formed, which rests on the upper end of the spring extension S to the holder.

The holder C is of an ordinary form throughout the greater portion of its length. Near the point where it comes in contact with the tooth, however, its width is increased, and the rear portion extended up, terminating in a jaw $c$. Behind and under this jaw is the recess $c'$ for the point $b$ of the tooth, as above described. The corner of this recess preferably terminates in a round hole $c^2$ which not only serves the purpose of the usual pin hole, but also obviates the usual sharp corner. A second pin hole $c^3$ is preferably provided near the other end. The front portion of the holder continues on up along the under side of the shank of the tooth and forms a stiff spring S which bears against said tooth, holding it firmly in place. By this construction I not only secure the usual support on the under side of the tooth, but a positive interlocking formation which prevents it from being misplaced. The relative location of the jaw and spring portions of the holder, the jaw being on one side of the tooth and the spring portion on the other, is a valuable feature of the invention.

I have shown the holder with recesses or cavities $r$ extending longitudinally thereof, near to and substantially parallel with its exposed edge, for the purpose of protecting the holder from the evil effects of hammering on said edge, as such hammering where this construction is employed will have little effect further than to batter the edge, and is not likely to distort the body of the holder to any appreciable extent. With these recesses, only a thin web of metal connects the edge to the inner portion. This construction, however, is not claimed herein, but in my application Serial No. 440,062 of even date herewith.

Having thus fully described my said invention, what I claim as new, and desire to secure by Letters Patent, is—

1. A saw tooth having a recess and projection at its lower end, with its shank formed of uniform width and bounded by parallel curved lines, and with a shoulder at the upper end on the front side adapted to rest on the holder, substantially as shown and described.

2. The combination of the saw A having a socket bounded by curved lines struck from a common center the upper one of which is of a greater radius than the other, a saw tooth, having a hook-shaped lower end $b$ and a shoulder $s$ and a holder having a recess $c'$ to receive the lower end of the tooth, and a hook-shaped jaw $c$ to interlock therewith, substantially as shown and described.

In witness whereof I have hereunto set my hand and seal, at Indianapolis, Indiana, this 7th day of July, A. D. 1892.

ANDREW KRIEGER. [L. S.]

Witnesses:
 CHESTER BRADFORD,
 J. A. WALSH.